United States Patent
Fu et al.

(10) Patent No.: US 9,730,206 B2
(45) Date of Patent: Aug. 8, 2017

(54) METHOD AND DEVICE FOR REPORTING CHANNEL STATE INFORMATION

(71) Applicant: Samsung Electronics Co., Ltd., Gyeonggi-do (KR)

(72) Inventors: Jingxing Fu, Beijing (CN); Yingyang Li, Beijing (CN); Chengjun Sun, Beijing (CN)

(73) Assignee: SAMSUNG ELECTRONICS CO., LTD. (KR)

( * ) Notice: Subject to any disclaimer, the term of this patent is extended or adjusted under 35 U.S.C. 154(b) by 58 days.

(21) Appl. No.: 14/763,253

(22) PCT Filed: Jan. 24, 2014

(86) PCT No.: PCT/KR2014/000714
§ 371 (c)(1),
(2) Date: Jul. 24, 2015

(87) PCT Pub. No.: WO2014/116061
PCT Pub. Date: Jul. 31, 2014

(65) Prior Publication Data
US 2015/0365925 A1   Dec. 17, 2015

(30) Foreign Application Priority Data
Jan. 24, 2013   (CN) .......................... 2013 1 0027278

(51) Int. Cl.
*H04W 72/04* (2009.01)
*H04W 24/10* (2009.01)
(Continued)

(52) U.S. Cl.
CPC ......... *H04W 72/042* (2013.01); *H04L 1/0026* (2013.01); *H04L 1/1671* (2013.01);
(Continued)

(58) Field of Classification Search
CPC ..................................................... H04W 72/04
(Continued)

(56) References Cited

U.S. PATENT DOCUMENTS

| 2010/0041430 A1* | 2/2010 | Ishii ...................... H04L 5/0075 455/522 |
| 2012/0076040 A1 | 3/2012 | Hoshino et al. |

(Continued)

FOREIGN PATENT DOCUMENTS

WO   2012/112291   8/2012

OTHER PUBLICATIONS

International Search Report corresponding to International Patent Application No. PCT/KR2014/000714 mailed Apr. 29, 2014.
(Continued)

*Primary Examiner* — Charles C Jiang
*Assistant Examiner* — Emmanuel Maglo
(74) *Attorney, Agent, or Firm* — McAndrews, Held & Malloy, Ltd.

(57) ABSTRACT

Disclosed is a method for reporting channel state information (CSI), first, an instruction instructing a UE to report the CSI are acquired by the UE from a PDCCH scheduling the PDSCH; then, the UE measures the reference signal to give CSI; finally, the UE reports CSI on the PUCCH or the PUSCH transmitting the HARQ-ACK feedback information of the PDSCH. The present application also discloses a device. With the technical solution disclosed in the present application, the flexibility of CSI transmission can be enhanced.

16 Claims, 2 Drawing Sheets

(51) Int. Cl.
  *H04L 1/16* (2006.01)
  *H04L 5/00* (2006.01)
  *H04L 1/00* (2006.01)
(52) U.S. Cl.
  CPC ........... *H04L 5/0048* (2013.01); *H04W 24/10* (2013.01); *H04W 72/0413* (2013.01); *H04L 1/0031* (2013.01); *H04L 5/0057* (2013.01)
(58) Field of Classification Search
  USPC .......................... 370/325, 329; 455/422, 436
  See application file for complete search history.

(56) References Cited

U.S. PATENT DOCUMENTS

| | | | | |
|---|---|---|---|---|
| 2012/0120817 A1* | 5/2012 | Khoshnevis | .......... | H04L 1/0026 370/252 |
| 2012/0127869 A1* | 5/2012 | Yin | .......... | H04L 1/0031 370/252 |
| 2012/0201154 A1 | 8/2012 | Chandrasekhar et al. | | |
| 2013/0034064 A1* | 2/2013 | Nam | .......... | H04W 72/1294 370/329 |
| 2013/0083748 A1* | 4/2013 | Li | .......... | H04L 5/14 370/329 |
| 2013/0336160 A1* | 12/2013 | Yin | .......... | H04L 1/1854 370/254 |
| 2014/0119246 A1* | 5/2014 | Yin | .......... | H04W 72/12 370/280 |
| 2014/0362792 A1* | 12/2014 | Cheng | .......... | H04L 1/0029 370/329 |
| 2014/0362797 A1* | 12/2014 | Aiba | .......... | H04L 1/0026 370/329 |
| 2014/0376424 A1* | 12/2014 | Seo | .......... | H04L 1/0026 370/280 |
| 2015/0131568 A1* | 5/2015 | You | .......... | H04L 5/001 370/329 |
| 2015/0181576 A1* | 6/2015 | Papasakellariou | .... | H04L 5/0053 370/329 |
| 2015/0223230 A1* | 8/2015 | Liang | .......... | H04W 72/042 370/329 |

OTHER PUBLICATIONS

3GPP TS 36.213 V11.1.0 3GPP; TSGRAN; Evolved Universal Terrestrial Radio Access (E-UTRA); Physical layer procedures (Release 11), Dec. 20, 2012 (http://www.3gpp.org/DynaReport/36213.htm) See pp. 55-57; and tables 7.2.1-1B, 7.2.1-1.

* cited by examiner

[Fig. 1]
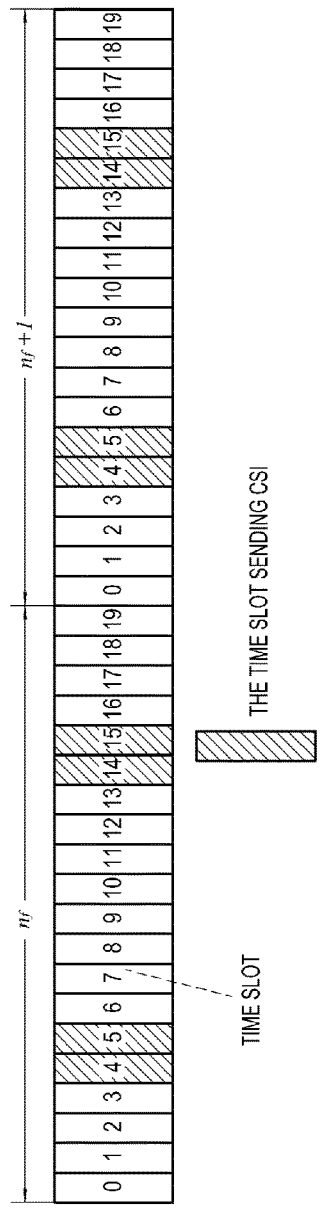
[Fig. 2]
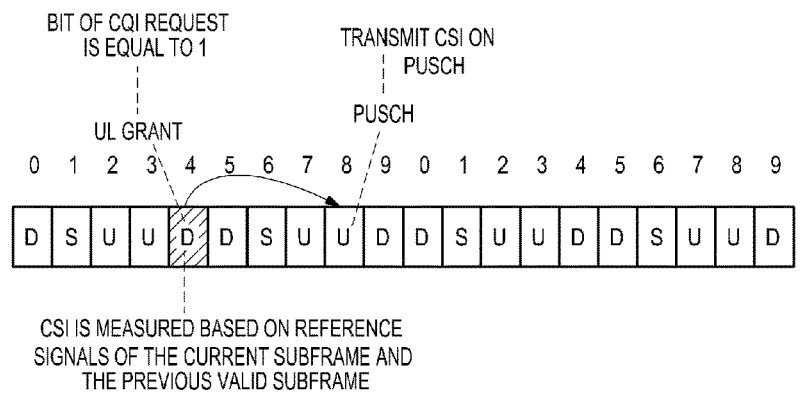

[Fig. 3]
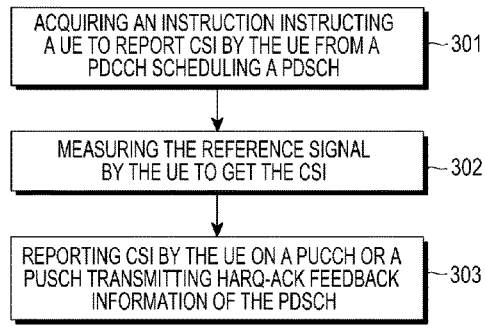
[Fig. 4]
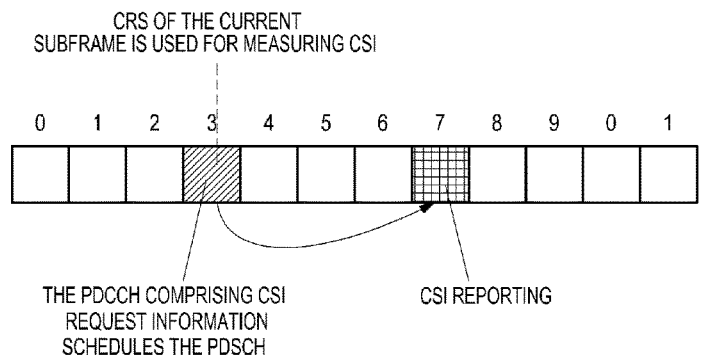
[Fig. 5]
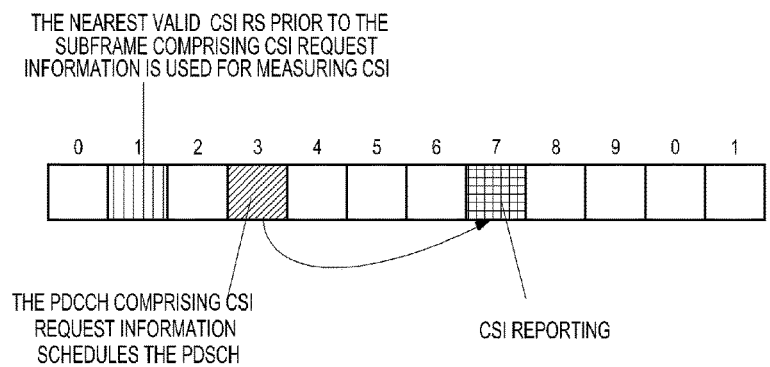
[Fig. 6]
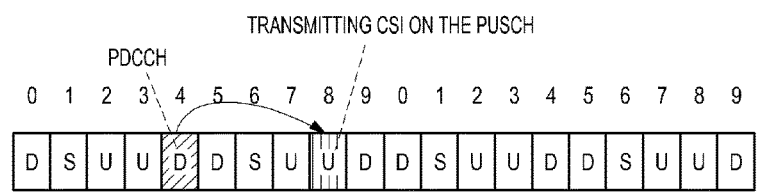
[Fig. 7]
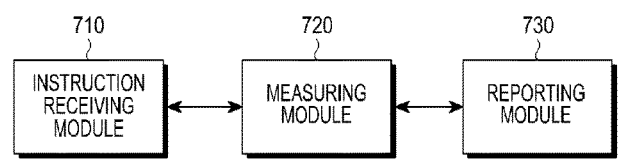

METHOD AND DEVICE FOR REPORTING CHANNEL STATE INFORMATION

PRIORITY

This application is a National Phase Entry of PCT international Application No. PCT/KR201.41000714, which was filed on Jan. 24, 2014, and claims a priority to Chinese Patent Application No. 201310027278.3, which was filed on Jan. 24, 2013, the contents of which are incorporated herein by reference.

TECHNICAL FIELD

The present application relates to a method and device for report the channel state information (CSI) in a wireless communication system.

BACKGROUND ART

In a Long Term Evolution-Advanced system (LTE-A), the reporting of channel state information (CSI) is classified as the periodic CSI reporting and the aperiodic CSI reporting.

The periodic CSI reporting is configured by a higher-layer signaling, i.e., the period and time offset of CSI reporting is configured by a higher-layer signaling, the terminal (UE) transmits the CSI on a physical uplink control channel (PUCCH) or a physical uplink shared channel (PUSCH) of a subframe satisfying the condition according to the period and time offset configured by the higher-layer signaling. For example, assuming the period of CSI reporting configured by the higher-layer signaling is $N_P$, the time offset of CSI reporting is $N_{offset}$, the UE transmits CSI on the time slot satisfying the condition $(10 \times n_f + \lfloor n_s/2 \rfloor - N_{offset}) \mod (N_P) = 0$, wherein: of is a radio frame number, $n_s$ is a time slot number within a radio frame.

FIG. 1 is a schematic diagram of an existing periodic CSI reporting.

As shown in FIG. 1, assuming $N_P=5$, $N_{offset}=2$, on radio frame 0, it is calculated according to formula $(10 \times n_f + \lfloor n_s/2 \rfloor - N_{offset}) \mod (N_P) = 0$ that the UE will transmit CSI on time slots 4, 5, 14 and 15.

The aperiodic CSI reporting is triggered by the "channel state information request information (CQI Request)" event in the physical downlink control channel (PDCCH) scheduling the PUSCH, the UE transmits aperiodic CSI on the PUSCH depending on the state of the "channel state information request information".

FIG. 2 is a schematic diagram of an existing aperiodic CSI reporting.

For example, see FIG. 2, if UE receives effective "channel state information request information" that CQI Request bit is equal to 1 carried in the PDCCH scheduling the PUSCH in subframe 4, the UE is instructed to transmit aperiodic CSI on PUSCH on subframe 8.

DISCLOSURE OF INVENTION

Technical Problem

In LTE-A, in order to support higher UE transmission rate, carrier aggregation (CA) is introduced, which means larger working bandwidth is obtained by aggregating multiple component carriers (CC), and downlink and uplink of a communication system is constituted. Independent CSI needs to be fed back for each CC; while in order to maintain the ratio of peak power and average power of transmitting of uplink signal by a UE, feedback of CSI is only transmitted in one CC of all CCs in carrier aggregation, and hybrid automatic repeat-request acknowledgement (HARQ-ACK) feedback information is also to be transmitted in this CC, this will result in collision of CSI and HARQ-ACK feedback information, and, when the total bits of CSI and HARQ-ACK feedback information is more than N bits (e.g. 20 bits), CSI will be discarded away, which reduces the feedback precision of CSI on time. How to take some measures to allow the transmission of CSI to be more flexibility is the technical problem required to be solved by this application.

Solution to Problem

The present application provides a method and device for reporting channel state information to enhance the flexibility of CSI transmission.

In accordance with an aspect of the present disclosure, a method for reporting channel state information provided in the present application comprises: acquiring instructions instructing a user equipment (UE) to report CSI by the UE from a physical downlink control channel (PDCCH) scheduling a physical downlink shared channel (PDSCH); measuring the reference signal by the UE to give CSI; reporting CSI by the UE on a physical uplink control channel (PUCCH) or a physical uplink shared channel (PUSCH) transmitting HARQ-ACK feedback information of the PDSCH.

In accordance with an aspect of the present disclosure, The present application also provides a device comprising: an instruction receiving module, a measuring module and a reporting module, wherein: the instruction receiving module is used for acquiring instructions instructing the present device to report CSI from a physical downlink control channel (PDCCH) scheduling a physical downlink shared channel (PDSCH); the measuring module is used for measuring the reference signal to give CSI; the reporting module is used for reporting CSI on a physical uplink control channel (PUCCH) or a physical uplink shared channel (PUSCH) transmitting HARQ-ACK feedback information of the PDSCH.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF DRAWINGS

The above and other aspects, features, and advantages of certain embodiments of the present disclosure will be more apparent from the following description taken in conjunction with the accompanying drawings, in which:

FIG. 1 is a schematic diagram of an existing periodic CSI reporting;

FIG. 2 is a schematic diagram of an existing aperiodic CSI reporting;

FIG. 3 is a flow chart of an embodiment of the method for reporting CSI of the present application;

FIG. 4 is a schematic diagram of measurement of the CRS on a subframe of the PDCCH scheduling the PDSCH by the UE in a preferred embodiment of the present application;

FIG. 5 is a schematic diagram of measurement of the CSI RS on a subframe prior to the subframe of the PDCCH scheduling the PDSCH by the UE in a preferred embodiment of the present application;

FIG. 6 is a schematic diagram of the timing relationship between the subframe of the PDCCH scheduling the PDSCH and the subframe of the PUCCH or the PUSCH transmitting CSI in a preferred embodiment of the present application;

FIG. 7 is a schematic diagram of the compositional structure of a preferred device of the present application.

BEST MODE FOR CARRYING OUT THE INVENTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In order to make the objects, technical solutions and advantages of the present application more apparent, the present application will be described in further detail below with reference to the accompanying figures and embodiments.

FIG. 3 is a flow chart of an embodiment of the method for reporting CSI of the present application. As shown in FIG. 3, the following steps are included:

In a Step 301, a UE acquires instructions instructing the UE to report CSI from the PDCCH scheduling the PDSCH.

When the PDSCH data of a certain downlink subframe is scheduled, the base station is required to send a corresponding PDCCH to implement this scheduling, and the HARQ-ACK feedback information of the PDSCH data is transmitted on the PUCCH or PUSCH of an uplink subframe determined according to the HARQ-ACK timing relationship. Based on this, the application proposes: when the PDSCH of any one downlink subframe is scheduled, the base station can carry instructions instructing this UE to report CSI by scheduling the PDCCH of the downlink subframe, which instructions instruct the UE to reporting CSI on the PUCCH or the PUSCH transmitting the HARQ-ACK feedback information of the PDSCH. Which is provided by this application is in fact an aperiodic CSI reporting method.

In order to achieve the above instructing, the present application provides the following instructing manners.

Instructing Manner 1:

instructing whether to report CSI simultaneously on the PUCCH or the PUSCH transmitting the HARQ-ACK feedback information of the PDSCH by increasing 1 bit of information in the PDCCH scheduling the PDSCH or using 1 padding bit in the PDCCH, the mode of reporting CSI being the same with the periodic CSI reporting mode configured by the UE or using the CSI reporting mode configured by the higher-layer signaling.

For example, suppose 1 bit of "channel state information request information" is used to perform instruction, it may be defined that: when the channel state information request information is "0", it is instructed not to report CSI on the PUCCH or the PUSCH transmitting the HARQ-ACK feedback information; when the channel state information request information is "1", it is instructed to report CSI simultaneously on the PUCCH or the PUSCH transmitting the HARQ-ACK feedback information, as shown in table 1:

TABLE 1

| Channel state information request information value | Description |
| --- | --- |
| 0 | Not to report aperiodic CSI |
| 1 | to report aperiodic CSI, and to use wideband CQI reporting mode |

Instructing Manner 2:

Instructing whether to report CSI simultaneously on the PUCCH or the PUSCH transmitting the HARQ-ACK feedback information of the PDSCH by increasing 2 bits of information in the PDCCH scheduling the PDSCH or using 2 padding bits in the PDCCH, or instructing whether to report CSI simultaneously on the PUCCH or the PUSCH transmitting the HARQ-ACK feedback information of the PDSCH and the reporting mode of CSI by increasing a plurality of bits of information in the PDCCH scheduling the PDSCH or using a plurality of padding bits in the PDCCH.

For example, suppose 2 bits of "channel state information request information" is used to perform instruction, it may be defined that:

when the channel state information request information is "00", it is instructed not to report CSI on the PUCCH or the PUSCH transmitting the HARQ-ACK feedback information of the PDSCH;

when the channel state information request information is "01", it is instructed to report CSI simultaneously on the PUCCH or the PUSCH transmitting the HARQ-ACK feedback information of the PDSCH, and the mode of reporting CSI is the same with the wideband CQI reporting mode of the periodic CSI reporting configured by the UE;

when the channel state information request information is "10", it is instructed to report CSI simultaneously on the PUCCH or the PUSCH transmitting the HARQ-ACK feedback information of the PDSCH, and the mode of reporting CSI is a first CSI reporting mode configured by the higher-layer signaling;

when the channel state information request information is "11", it is instructed to report CSI simultaneously on the PUCCH or the PUSCH transmitting the HARQ-ACK feedback information of the PDSCH, and the mode of reporting CSI is a second CSI reporting mode configured by the higher-layer signaling;

TABLE 2

| Channel state information request information value | Description |
|---|---|
| 00 | Not to report aperiodic CSI |
| 01 | to report aperiodic CSI, and to use the wideband CQI reporting mode of the periodic CSI reporting |
| 10 | to report aperiodic CSI, and to use a first CSI reporting mode configured by the higher-layer signaling |
| 11 | to report aperiodic CSI, and to use a second CSI reporting mode configured by the higher-layer signaling |

Instructing Manner 3:

Instructing whether to report CSI simultaneously on the PUCCH or the PUSCH transmitting the HARQ-ACK feedback information of the PDSCH by increasing 2 bits of information in the PDCCH scheduling the PDSCH or using 2 padding bits in the PDCCH, or instructing whether to report CSI simultaneously on the PUCCH or the PUSCH transmitting the HARQ-ACK feedback information of the PDSCH and the reporting mode of CSI by increasing a plurality of bits of information in the PDCCH scheduling the PDSCH or using a plurality of padding bits in the PDCCH. The reporting mode of CSI may be a wideband CQI reporting mode, a differential CQI reporting mode compared to the wideband CQI or a subband CQI feedback reporting mode selected by the UE.

For example, suppose 2 bits of "channel state information request information" is used to perform instruction, it may be defined that:

when the channel state information request information is "00", it is instructed not to report CSI on the PUCCH or the PUSCH transmitting the HARQ-ACK feedback information of the PDSCH;

when the channel state information request information is "01", it is instructed to report CSI simultaneously on the PUCCH or the PUSCH transmitting the HARQ-ACK feedback information of the PDSCH, and the mode of reporting CSI is the same with the wideband CQI reporting mode of the periodic CSI reporting configured by the UE;

when the channel state information request information is "10", it is instructed to report CSI simultaneously on the PUCCH or the PUSCH transmitting the HARQ-ACK feedback information of the PDSCH, and the mode of reporting CSI is a differential CQI reporting mode compared to the wideband CQI;

when the channel state information request information is "11", it is instructed to report CSI simultaneously on the PUCCH or the PUSCH transmitting the HARQ-ACK feedback information of the PDSCH, and the mode of reporting CSI is a subband CQI feedback reporting mode selected by the UE;

As shown in table 3:
Table 3

TABLE 3

| Channel state information request information value | Description |
|---|---|
| 00 | Not to report aperiodic CSI |
| 01 | to report aperiodic CSI, and to use wideband CQI reporting mode of periodic CSI reporting |
| 10 | to report aperiodic CSI, and to use a differential CQI reporting mode compared to the periodic wideband CQI |
| 11 | to report aperiodic CSI, and to use a subband CQI feedback reporting mode selected by the UE |

In a step 302, the UE measures the reference signal to give CSI.

For a terminal, the aperiodic CSI feedback is event-triggered, if the channel state information request information obtained the UE instructs that CSI is required to be fed back, the UE requires to perform corresponding CSI measurement on the reference signal, thereby giving the CSI required to be fed back.

For example, the resource of the channel state information reference signal measured by the UE can be cell-specific reference signals (CRS), channel state information reference signals (CSI RS) or dedicated demodulation reference symbols (DMRS) for demodulating the PDSCH on the PDCCH subframe modulating the PDSCH. FIG. 4 is a schematic diagram of measurement of the CRS on a subframe of the PDCCH scheduling the PDSCH by the UE in a preferred embodiment of the present application, as shown in FIG. 4, on the subframe 3, the PDCCH scheduling the PDSCH subframe comprises channel state information request information, and the UE performs channel state information measurement on the CRS of the subframe 3.

The resource of the channel state information reference signal measured by the UE can be the active CRS or CSI RS on the nearest subframes prior to the PDCCH subframe modulating the PDSCH. FIG. 5 is a schematic diagram of measurement of the CSI RS on a subframe prior to the subframe of the PDCCH scheduling the PDSCH by the UE in a preferred embodiment of the present application, as shown in FIG. 5, on the subframe 3, the PDCCH scheduling the PDSCH subframe comprises channel state information request information, subframe 3 does not have an active CSI RS, prior to the PDCCH subframe scheduling the PDSCH, the subframe which has an active CSI RS and which is the nearest is the subframe 1, then the UE performs channel state information measurement on the CSI RS of the subframe 1.

In the step 303, the UE reports CSI on the PUCCH or the PUSCH transmitting the HARQ-ACK feedback information of the PDSCH.

The timing relationship between the subframe of the PDCCH scheduling the PDSCH and the subframe of the PUCCH or the PUSCH reporting CSI conforms to the timing relationship between the subframe of the PDCCH scheduling the PDSCH and the subframe of the PUCCH or the PUSCH transmitting the HARQ-ACK feedback information, i.e., CSI and the HARQ-ACK feedback information are transmitted on the PUCCH or the PUSCH of the same subframe.

For example, suppose the TDD uplink downlink configuration 1 is employed, the timing relationship between the subframe of the PDCCH scheduling the PDSCH and the subframe of the PUCCH or the PUSCH transmitting the HARQ-ACK feedback information conforms to the HARQ-ACK timing relationship of the TDD uplink downlink configuration 1, if the PDCCH scheduling the PDSCH is on the subframe 4, the PUCCH or PUSCH transmitting the HARQ-ACK feedback information is on the subframe 8, and the CSI is reported on the subframe 8, FIG. 6 is a schematic diagram of the timing relationship between the subframe of the PDCCH scheduling the PDSCH and the subframe of the PUCCH or the PUSCH transmitting CSI in a preferred embodiment of the present application, as shown in FIG. 6.

The CSI information may be reported on the PUCCH or on the PUSCH using the PUCCH format 3.

When the aperiodic CSI using the PUCCH format 3 and the HARQ-ACK feedback information are simultaneously transmitted, the CSI and the HARQ-ACK feedback information may be jointly encoded and then transmitted;

When there is a PUSCH transmission on the subframe reporting CSI triggered by the PDCCH scheduling the PDSCH, and the PUCCH and the PUSCH are not configured to be simultaneously transmitted, CSI information is transmitted on the PUSCH according to the existing technology.

when the CSI information whose reporting is triggered by the PDCCH scheduling the PDSCH using the PUCCH format 3 and the HARQ-ACK feedback and the scheduling request (SR) information are simultaneously transmitted and the sum of bits of the CSI, the HARQ-ACK feedback information and the SR information exceeds N (for example, 20 bits), the CSI information is discarded.

When there is a CSI reporting triggered by the PDCCH scheduling the PUSCH on the subframe reporting CSI triggered by the PDCCH scheduling the PDSCH, CSI is fed back according to the format of the CSI information whose reporting is triggered by the PDCCH scheduling the PUSCH, and the CSI information whose reporting is triggered by the PDCCH scheduling the PUSCH is discarded.

When there is a periodic CSI reporting on the subframe reporting CSI triggered by the PDCCH scheduling the PDSCH, CSI is fed back according to the format of the CSI information whose reporting is triggered by the PDCCH scheduling the PUSCH, and the periodic CSI information is discarded.

Corresponding to the above method, FIG. 7 is a schematic diagram of the compositional structure of a device is also provided in the present application.

as shown in FIG. 7, the device comprising: an instruction receiving module 710, a measuring module 720 and a reporting module 730, wherein:

the instruction receiving module 710 is used for acquiring instructions instructing the present device to report CSI from the PDCCH scheduling the PDSCH;

the measuring module 720 is used for measuring the reference signal to give CSI;

the reporting module 730 is used for reporting CSI on the PUCCH or the PUSCH transmitting the HARQ-ACK feedback information of the PDSCH.

Preferably, the instructions instructing the present device to report CSI received by the instruction receiving module are: channel state information request information having a length of N bits in the PDCCH, or channel state information request information represented using N padding bits in the PDCCH, wherein, N is greater than or equal to 1; different values of the channel state information request information represent if CSI is reported on the PUCCH or the PUSCH transmitting the HARQ-ACK feedback information of the PDSCH and reporting modes of CSI, respectively.

In summary, with the technical solution of the present application, the feedback problem of the aperiodic CSI is solved; triggering the feedback of aperiodic CSI by the channel state information request information in the PDCCH scheduling the PDSCH, the flexibility of the CSI feedback is enhanced. In addition, by increasing the flexibility of the CSI feedback, collision of transmission of CSI and transmission of the HARQ-ACK feedback information can be prevented as much as possible, thereby improving the accuracy of the CSI feedback.

The present invention has been described with reference to presently preferred embodiments thereof, other embodiments as well as obvious variations and modifications to all the embodiments will be readily apparent to those of ordinary skill in the art.

The foregoing are preferred embodiments of the present application only and are not intended to limit the present application, any modification, equivalent substitution and improvement may be included within the protection scope of the application within the spirit and principle of the present application.

The invention claimed is:

1. A method for reporting channel state information (CSI) at a user equipment (UE), the method comprising:
   receiving an instruction information to report the CSI on a physical downlink control channel (PDCCH);
   measuring a reference signal based on the instruction information;
   reporting the CSI generated based on the measured reference signal on a physical uplink control channel (PUCCH) or a physical uplink shared channel (PUSCH),
   wherein if the CSI is reported using a PUCCH format 3, the reporting the CSI comprises:
   determining whether a bit sum of the CSI, the HARQ-ACK feedback information, and a scheduling request (SR) information is greater than a threshold when simultaneous transmission of the CSI, the SR information, and an a hybrid automatic repeat request acknowledgement (HARQ-ACK) feedback information of a block received from a physical downlink shared channel (PDSCH) is required;
   if the bit sum is greater than the threshold, discarding the CSI, and simultaneously transmitting the HARQ-ACK feedback information and the SR information.

2. The method according to claim 1, wherein; the instruction information comprises CSI request information having a length of N bits or N padding bits in the PDCCH, wherein, N is greater than or equal to 1.

3. The method according to claim 2, wherein if the N is equal to 1, the CSI request information comprises
   a first value indicating that the CSI is not reported on the PUCCH or PUSCH, and
   a second value indicating that the CSI is reported on the PUCCH or PUSCH and a periodic CSI reporting mode configured by the UE or a CSI reporting mode configured by a higher-layer signaling.

4. The method according to claim 2, wherein if the N is equal to 2, the CSI request information comprises a
   first value indicating that the CSI is not reported on the PUCCH or PUSCH,
   a second value indicating that the CSI is reported on the PUCCH or PUSCH and a wideband CQI reporting mode of a periodic CSI reporting configured by the UE,
   a third value indicating that the CSI is reported on the PUCCH or PUSCH, and a first CSI reporting mode configured by the higher-layer signaling, and
   a fourth value indicating that the CSI is reported on the PUCCH or PUSCH and a second CSI reporting mode configured by the higher-layer signaling.

5. The method according to claim 4,
wherein the first CSI reporting mode and the second different CSI reporting mode are different,
wherein the first CSI reporting mode and the second CSI reporting mode are differential CQI reporting modes compared to a wideband CQI or sub-band CQI feedback reporting modes selected by the UE.

6. The method according to claim 1, wherein the instruction information comprises a first value indicating that whether the CSI is reported on the PUCCH or PUSCH, and a second value indicating a reporting modes of the CSI.

7. The method according to claim 1, wherein the reference signal comprises one of
cell-specific reference signals (CRS), CSI reference signals (CSI RS), or dedicated demodulation reference symbols (DMRS) for demodulating the PDSCH of a subframe on which the PDCCH is located, or
wherein the reference signal comprises one of an active CRS or a CSI RS on nearest subframes prior to the subframe.

8. The method according to claim 1,
wherein if the CSI is reported using the PUCCH format 3, the reporting the CSI comprises:
jointly encoding the CSI and the HARQ-ACK feedback information when simultaneous transmission of the CSI and the HARQ-ACK feedback information is required; and
transmitting the encoded CSI and HARQ-ACK feedback information.

9. A device for reporting channel state information, the device comprising:
a transceiver configured to receive an instruction information to report the CSI on a physical downlink control channel (PDCCH);
a processor configured to measure a reference signal based on the instruction information, and control the transceiver to report the CSI generated based on the measured reference signal on a physical uplink control channel (PUCCH) or a physical uplink shared channel (PUSCH),
wherein if the CSI is reported using a PUCCH format 3, the processor is configured to determine whether a bit sum of the CSI, the HARQ-ACK feedback information, and a scheduling request (SR) information is greater than a threshold when simultaneous transmission of the CSI, the SR information, and an a hybrid automatic repeat request acknowledgement (HARQ-ACK) feedback information of a block received from a physical downlink shared channel (PDSCH) is required, if the bit sum is greater than the threshold, discard the CSI, and control the transceiver to simultaneously transmit the HARQ-ACK feedback information and the SR information.

10. The device according to claim 9, wherein the instruction information comprises CSI request information having a length of N bits or N padding bits in the PDCCH, wherein, N is greater than or equal to 1.

11. The device according to claim 10, wherein if the N is equal to 2,
a first value indicating that CSI is not reported on the PUCCH or PUSCH,
a second value indicating that the CSI is reported on the PUCCH or PUSCH and a wideband CQI reporting mode of a periodic CSI reporting configured by the UE,
a third value indicating that the CSI is reported on the PUCCH or PUSCH and a first CSI reporting mode configured by the higher-layer signaling, and
a fourth value indicating that the CSI is reported on the PUCCH or PUSCH and a second CSI reporting mode configured by the higher-layer signaling.

12. The device according to claim 11,
wherein the first CSI reporting mode and the second different CSI reporting mode are different,
wherein the first CSI reporting mode and the second CSI reporting mode are: differential CQI reporting modes compared to a wideband CQI or sub-band CQI feedback reporting modes selected by the UE.

13. The device according to claim 10, wherein the reference signal comprises one of cell-specific reference signals (CRS), CSI reference signals (CSI RS), or dedicated demodulation reference symbols (DMRS) for demodulating the PDSCH of a subframe on which the PDCCH is located, or
wherein the reference signal comprises one of an active CRS or a CSI RS on nearest subframes prior to the subframe.

14. The device according to claim 9, wherein the instruction information comprises a first value indicating that whether the CSI is reported on the PUCCH or PUSCH, and a second value indicating a reporting modes of the CSI.

15. The device according to claim 14, wherein if the N is equal to 1, the CSI request information comprises a first value indicating that the CSI is not reported on the PUCCH or PUSCH, and a second value indicating that the CSI is reported on the PUCCH or PUSCH and a periodic CSI reporting mode configured by the UE or a CSI reporting mode configured by a higher-layer signaling.

16. The device according to claim 9, wherein if the CSI is reported using PUCCH format 3, the processor is configured to jointly encode the CSI and the HARQ-ACK feedback information when simultaneous transmission of the CSI and the HARQ-ACK feedback information is required, and control the transceiver to transmit the encoded CSI and HARQ-ACK feedback information.

* * * * *